US009794161B2

(12) United States Patent
Treves et al.

(10) Patent No.: US 9,794,161 B2
(45) Date of Patent: Oct. 17, 2017

(54) METHODS AND SYSTEMS FOR NON-INTRUSIVE DEBUG PROCESSING OF NETWORK FRAMES

(71) Applicants: Ron Treves, Kfar Saba (IL); Evgeni Ginzburg, Petah Tikva (IL); Adi Katz, Ramat Gan (IL)

(72) Inventors: Ron Treves, Kfar Saba (IL); Evgeni Ginzburg, Petah Tikva (IL); Adi Katz, Ramat Gan (IL)

(73) Assignee: NXP USA, Inc., Austin, TX (US)

( * ) Notice: Subject to any disclaimer, the term of this patent is extended or adjusted under 35 U.S.C. 154(b) by 109 days.

(21) Appl. No.: 14/618,516

(22) Filed: Feb. 10, 2015

(65) Prior Publication Data
US 2016/0232048 A1 Aug. 11, 2016

(51) Int. Cl.
*G06F 11/07* (2006.01)
*H04L 12/26* (2006.01)

(52) U.S. Cl.
CPC ............ *H04L 43/50* (2013.01); *H04L 43/026* (2013.01)

(58) Field of Classification Search
None
See application file for complete search history.

(56) References Cited

U.S. PATENT DOCUMENTS

| 8,009,673 | B2 | 8/2011 | Gandal et al. |
| 2002/0186661 | A1* | 12/2002 | Santiago ................. H04L 47/10 370/252 |
| 2008/0170502 | A1 | 7/2008 | Benton et al. |
| 2008/0232269 | A1 | 9/2008 | Tatman et al. |
| 2009/0097501 | A1* | 4/2009 | Gandal ................. H04L 45/742 370/465 |
| 2012/0331351 | A1* | 12/2012 | Davis .................. G06F 11/3664 714/38.1 |
| 2014/0201354 | A1* | 7/2014 | Matthews ............... H04L 43/04 709/224 |
| 2016/0182373 | A1* | 6/2016 | Wang .................. H04L 45/7453 370/392 |

* cited by examiner

*Primary Examiner* — Kevin C Harper
*Assistant Examiner* — Derrick V Rose

(57) ABSTRACT

Methods and systems are disclosed for non-intrusive debug processing of network frames. For certain embodiments, a frame parser processes frames from a network interface and generates frame metadata. A key generation engine processes each frame and its related metadata to generate a normal key and a debug key. The same key composition rule formats and key generation engine are used to generate the normal key and the debug key to provide non-intrusive debug processing. Frame classification logic compares the normal key to classification tables to determine a frame classification for the received frame. Separate debug comparison logic compares the debug key to debug reference data/masks to generate debug markers for the received frame. The frame classification and the debug markers for each frame are provided to frame marking logic, and a frame processing engine then processes the resulting marked/classified frames.

16 Claims, 3 Drawing Sheets

METHODS AND SYSTEMS FOR NON-INTRUSIVE DEBUG PROCESSING OF NETWORK FRAMES

TECHNICAL FIELD

This technical field relates to debug processing of network packet communications.

BACKGROUND

It is often desirable for network connected systems to identify frames within network communications for later processing such as debug processing. However, existing solutions provide limited options for identification of frames. For example, one prior solution relies upon dedicated hardware to parse network frames and to compare header contents within those frames to fixed reference values. These comparisons are based upon data extracted from fixed locations or fields within a frame header, and only a specific pre-determined sequence will be detected as frames are streamed into the system. Prior solutions, therefore, lack flexibility with respect to debug processing.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
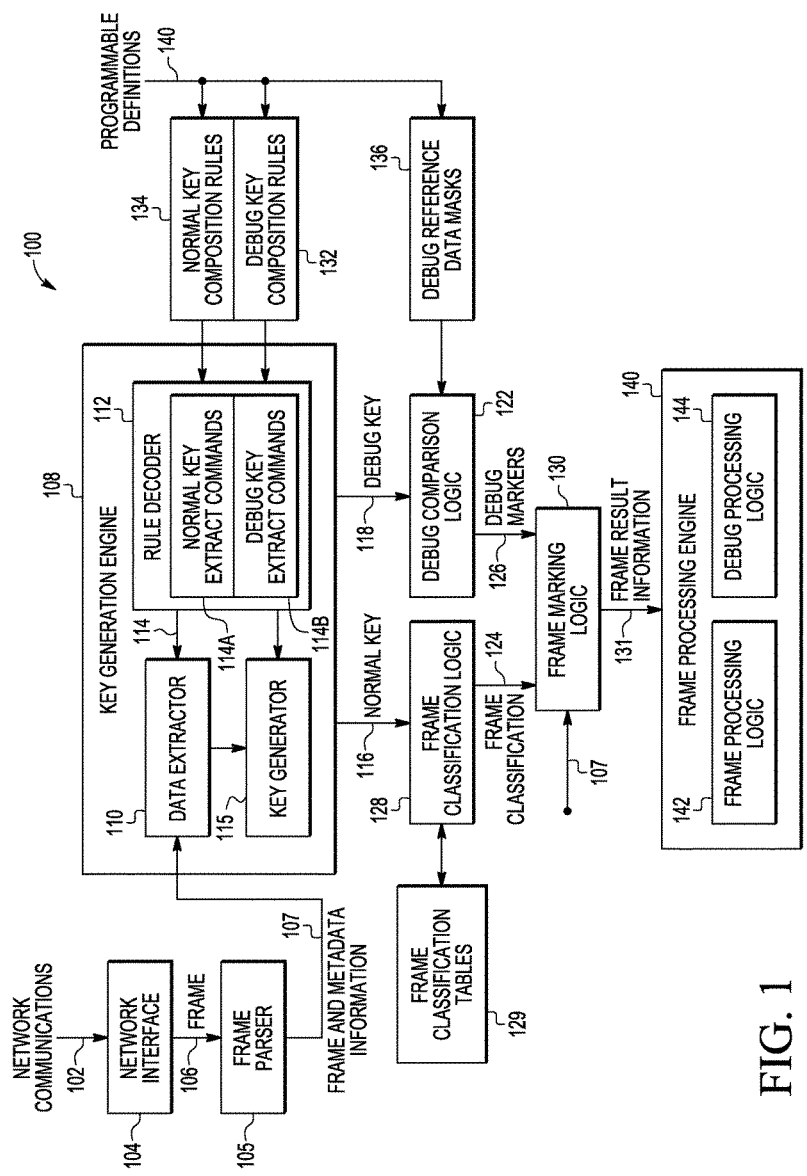
FIG. 1 is a block diagram of an embodiment for non-intrusive generation of debug keys and debug markers to mark network frames for debug processing along with frame classification results.

Methods and systems are disclosed for non-intrusive debug processing of network frames. For certain disclosed embodiments, a network interface receives network communications and outputs frames associated with the network communications. A frame parser processes frames from the network interface and generates frame metadata that is provided along with the frames to a key generation engine. The key generation engine processes each frame and its related metadata from the frame parser to generate a normal key and a debug key for the received frame. The normal key is based upon a first set of one or more fields from the received frame and/or the related metadata, and the debug key is based upon a second set of one or more fields from the received frame and/or the related metadata. The normal key is then used by frame classification logic to perform one or more table lookups that return a frame classification result for the received frame. Separate debug comparison logic compares the debug key to debug reference data to generate one or more debug markers for the received frame. Frame marking logic then marks each classified frame with the debug markers when the frame classification result is provided to a frame processing engine to classify the received frame. The debug markers, for example, can be added to the frame metadata that is provided to the frame processing engine along with the received frame. Frame processing logic within the frame processing engine then processes the frame based upon the frame classification. Debug processing logic within the frame processing engine triggers one or more different debug procedures based on the debug markers. Key composition rule formats and the key generation engine used for generation of normal keys are also used for generation of debug keys, and the debug processing is non-intrusive with respect to the frame classification processing. Different features and variations can be implemented, as desired, and related or modified systems and methods can be utilized, as well.

As described herein, the disclosed embodiments provide significant flexibility in marking network frames for debug processing to provide real-time debug processing that is non-intrusive with respect to normal frame classification and processing operations. The same frame key composition rule formats and key generation engine are used to generate both normal keys for frame classification and to generate debug keys for debug marking for received network frames. As such, a wide variety of key composition rules and related frame data and metadata extract commands can be formed and applied to generate debug keys for incoming frames that are then compared to reference data to detect and mark frames for debug processing. A wide variety of data masks can also be applied as part of this comparison. As existing key generation hardware resources for normal key generation are also used to provide debug key generation, the number of additional registers and/or fixed pre-configured values to be stored can be significantly reduced or eliminated. Further, the fields to be used for debug data extraction can be adaptively selected through user programmable definition of the debug key composition rules, thereby providing for great flexibility in detecting and marking network frames for debug processing. Other variations can also be implemented.

FIG. 1 is a block diagram of an embodiment 100 for non-intrusive generation of debug keys and debug markers to mark network frames for debug processing along with frame classification results. A network interface 104 receives network communications 102, such as network packets or other network communications. Network interface 104 provides one or more network frames 106 associated with the network communications 102 to a frame parser 105. Frame parser 105 then parses the contents of each frame 106 and generates metadata associated with the frame 106. The metadata can include a variety of information related to the processed frames such as, for example, pointers to frame header fields, port numbers, traffic classes, and/or other information related to the frames and the frame contents. The frame data and the generated metadata can be stored within a data storage medium such as a frame buffer, if desired. After parsing the frames and generating the metadata associated with the frames, the frame parser 105 forwards the frame and metadata information 107 to key generation engine 108.

The key generation engine 108 generates a normal key 116 and a debug key 118 based upon data extracted from the frames and metadata information 107. The key generation engine 108 includes a rule decoder 112, a data extractor 110, and the key generator 115. The data extracted by data extractor 110 from the network frames and related metadata information 107 is based upon extract commands 114 from the rule decoder 112. The extract commands 114 include normal key extract commands 114A that are directed to normal frame processing operations and debug key extract commands 114B that are directed to debug processing operations. The rule decoder 112 generates the normal key extract commands 114A based upon normal key composition rules 134, and the key generator 115 generates the normal key 116 based upon the data extracted using these normal key extract commands 114A. Similarly, the rule decoder 112 generates the debug key extract commands 114B based upon the debug key composition rules 132, and the key generator 115 generates the debug key 118 based upon the data extracted using these debug key extract commands 114B. The debug key composition rules 132 and the normal key composition rules 134 can be defined by users through user programmable definitions 140. It is noted that the same key generator 115 is used to generate both the normal key 116 and also to generate the debug key 118. As such, similar composition rule formats and protocols can be used for both the normal key composition rules 134 and the debug key composition rules 132.

With respect to a classification processing path, the normal key 116 generated by the key generation engine 108 is provided to the frame classification logic 128. The frame classification logic 128 performs a table lookup search to compare the normal key 116 to data within frame classification tables 129 to identify and generate a frame classification 124 for each received frame 106. The frame classification 124 is then provided to the frame marking logic 130 along with the frame and metadata information 107. The frame classification 124 can include, for example, an indication that the frame is a data frame, an audio/video frame, a high priority frame, a low priority frame, and/or any other frame classification type.

With respect to a debug processing path, the debug key 118 generated by the key generation engine 108 is provided to the debug comparison logic 122. The debug comparison logic 122 compares each debug key 118 to debug reference data from the debug reference data/masks 136 to generate one or more debug markers 126 for each received frame 106 if debug comparison matches are found. The debug comparison logic 122 can also apply one or more data masks from the debug reference data/masks 136 to the debug keys 118 as part of the reference data comparison. The resulting debug markers 126 are provided to the frame marking logic 130. The debug markers 126 can include an indication that the frame 106 should be traced, analyzed for data errors, analyzed for latency, and/or analyzed with respect to any other desired debug operation. It is further noted that the debug reference data and/or data masks 136 applied by the debug comparison logic processor 122 to determine debug comparison matches can be defined by users through programmable definitions 140. For certain embodiments, the debug comparison logic 122 is configured to operate concurrently with the frame classification logic such that the comparison of the debug key 118 to debug reference data to generate the debug markers 126 occurs at least in part concurrently with the comparison of the normal key 116 to frame classification tables to generate the frame classification 124. Other variations can also be implemented.

The frame marking logic 130 receives the resulting frame classification 124 and debug markers 126 for each frame 106. For certain embodiments, the frame classification 124 and the debug markers 126 are received in phase with each other with respect to the timing of processing cycles for the frame marking logic 130. The frame marking logic 130 uses the frame classification 124 and any debug markers 126 to determine how to classify and mark each frame and related metadata. The frame marking logic 130 then provides the frame result information 131 for each of the received frames 106 to the frame processing engine 140. This frame result information 131 includes the frame and metadata information 107 as classified with the frame classification 124 and as marked with any debug markers 126 to the extent that one or more matches were found for the debug key 118. If no match is found for the debug key 118, no debug markers 126 will be identified for the frame, and the frame result information 131 will not contain debug markers 126. The frame processing engine 140 uses the frame result information 131, which includes the classified and possibly marked frame and metadata information, to determine how to process each of the received frames 106 using the frame processing logic 142 and the debug processing logic 144.

In operation, the frame classification logic 128 can be configured to perform one or more table lookups to the frame classification tables 129 using the normal key 116 that is generated for the frame 106 by the key generation engine 108. This key generation engine 108 is also used to generate the debug key 118 for the frame 106. The debug comparison logic 122 can be configured to perform one or more comparison to the debug reference data and/or masks 136 using the debug key 118. As such, the generation of debug keys and debug markers provided by embodiment 100 is logically orthogonal and non-intrusive with respect to the generation of normal frame processing keys and frame classifications. When the frame is analyzed for classification, a debug key 118 generated based on debug key composition rules 132 is also compared to reference data and masks, if applicable, as defined in the debug reference data and masks 136. If a match is found, a debug marker 126 is generated for the frame, and different debug markers 126 can be applied depending on which reference data matches are found to be met by the debug comparison logic 122. The debug markers 126 applied to mark a frame by the frame marking logic 130 are then used to trigger debug processing by the debug processing logic 144 within the frame processing engine 140.

It is noted that the key generation engine 108, the frame classification logic 128, the debug comparison logic 122, the frame marking logic 130, and/or the frame processing engine 140 can be implemented using one or more processing devices including controllers, microcontrollers, processors, microprocessors, hardware accelerators, configurable logic devices (e.g., field programmable gate arrays), and/or other processing devices. It is further noted that the composition rules 132/134 and/or the reference data/masks 136 can be stored in one or more data registers and/or other data storage mediums including any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. Other variations could also be implemented.

Figure 2:
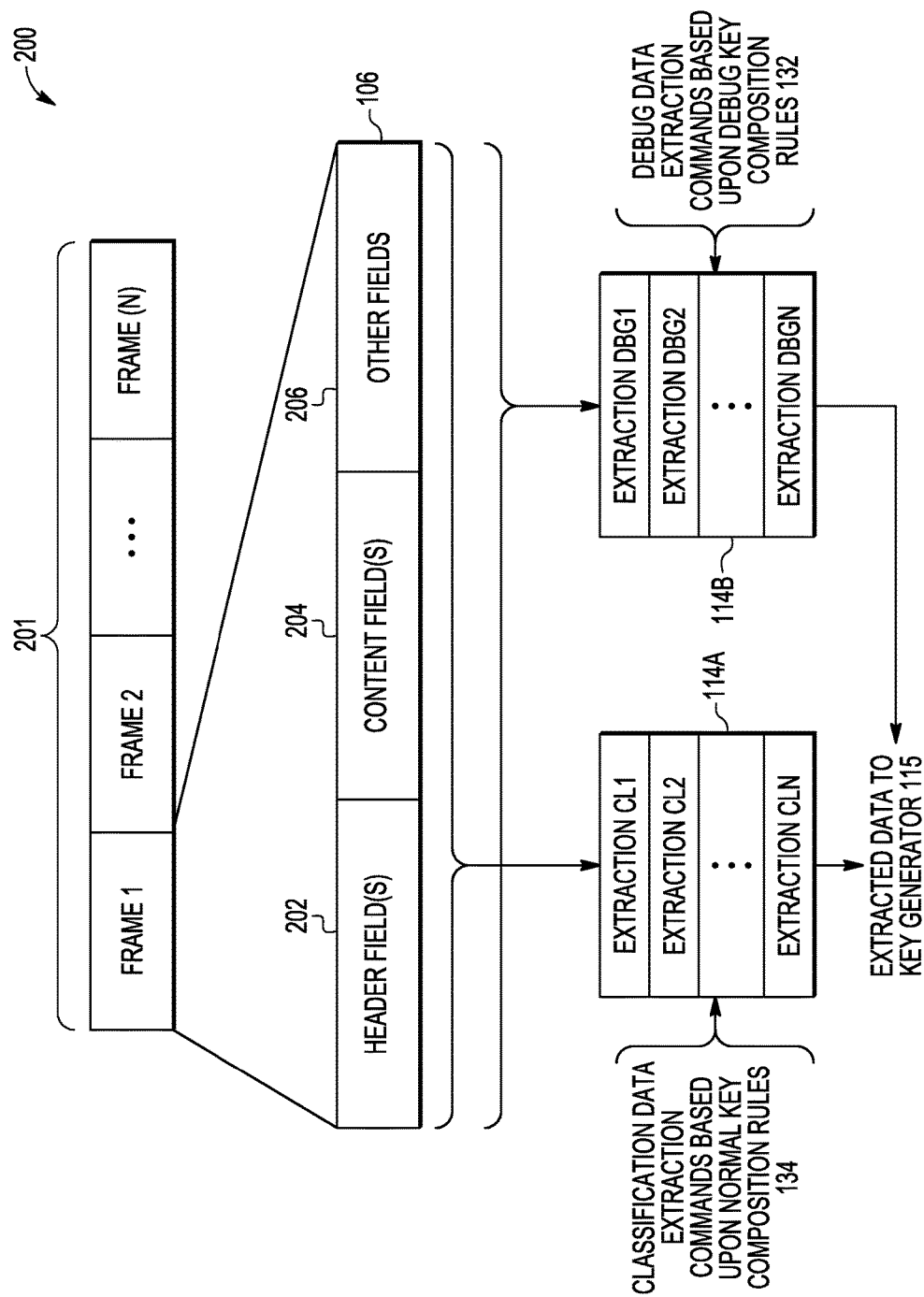
FIG. 2 is a block diagram of an example embodiment for frame contents and classification/debug data extract commands for generation of normal and debug keys.

FIG. 2 is a block diagram of an example embodiment 200 for frame contents and classification/debug data extract commands 114A-B for generation of normal and debug keys. A set of received frames 201 includes N different individual frames (FRAME1, FRAME2, . . . FRAME(N)). Each frame 106 includes one or more fields as represented by the contents of the first frame (FRAME1). For the example embodiment depicted, the fields of FRAME1 include one or more header fields 202, one or more content fields 204, and one or more other fields 206. As described above, the disclosed embodiments extract data from these fields based upon composition rules and generate classification/debug keys using the extracted data. In particular, one or more classification data extract commands 114A are used to extract data from a first set of one or more fields within each frame for the classification processing path, and these classification data extract commands 114A are based upon the normal key composition rules 134. Similarly, one or more debug data extract commands 114B are used to extract data from a second set of one or more fields within each frame for the debug processing path, and these debug data extract commands 114B are based upon the debug key composition rules 132.

For the example embodiment depicted, N classification data extract commands 114A (EXTRACTION CL1, EXTRACTION CL2, . . . EXTRACTION CLN) are generated, and the resulting extracted data is used to generate the normal key 116 that is used for normal frame processing. For the embodiment depicted, M debug data extract commands 114B (EXTRACTION DBG1, EXTRACTION DBG2, . . . EXTRACTION DBGM) are generated, and the resulting extracted data is used for key generation of the debug key 118 for debug processing. It is noted that the number (N) of classification extract commands 114A and the number (M) of debug extract commands 114B can be different, if desired, or they can be the same number. Further, each of the extract commands 114A/114B can be configured to identify data within one or more fields within the frame 106 to extract for key generation. For example, all of the data within a designated field can be extracted, a portion of the data within a designated field can be extracted, and/or combinations of data can be extracted. For example, data within header fields for TCP/IP (Transmission Control Protocol/Internet Protocol) frames can be extracted and used for debug key generation so that a debug trace may be applied without affecting the normal flow of system operations, including frame classification processing. Other data extractions and variations can also be used, as desired.

In operation, the debug key composition rules 132 are defined and used to determine the composition of a debug key 118 based upon data within a first set of one or more fields for the frame header fields 202, from the content fields 204, and/or from other fields 206 within the frame 106. These debug key composition rules 132 are then used to generate a sequence of extract commands 114B that are used to extract the data that is used to generate the debug key 118. The debug key 118 is then compared against debug reference data and/or masks 136 to identify comparison matches and thereby determine whether the frame 106 should be marked for later debug processing. This debug frame marking therefore relies upon keys generated using the same key generation engine and composition rule structures that are also used to generate the normal keys for frame classification. As such, the debug processing embodiments described herein rely upon existing hardware resources and do not negatively impact system throughput or performance for normal frame processing operations, thereby enabling non-intrusive real-time debug processing of received frames. Further, a wide variety of reference data can be used for comparison with the debug keys thereby allowing for a wide range of debug keys to be used in detecting and marking frames for debug processing. In addition, a wide variety of data masks can also be applied to the debug keys as part of this comparison processing and debug frame marking. Other variations and features can also be implemented while still taking advantage of the debug key generation and debug frame processing techniques described herein.

Figure 3:
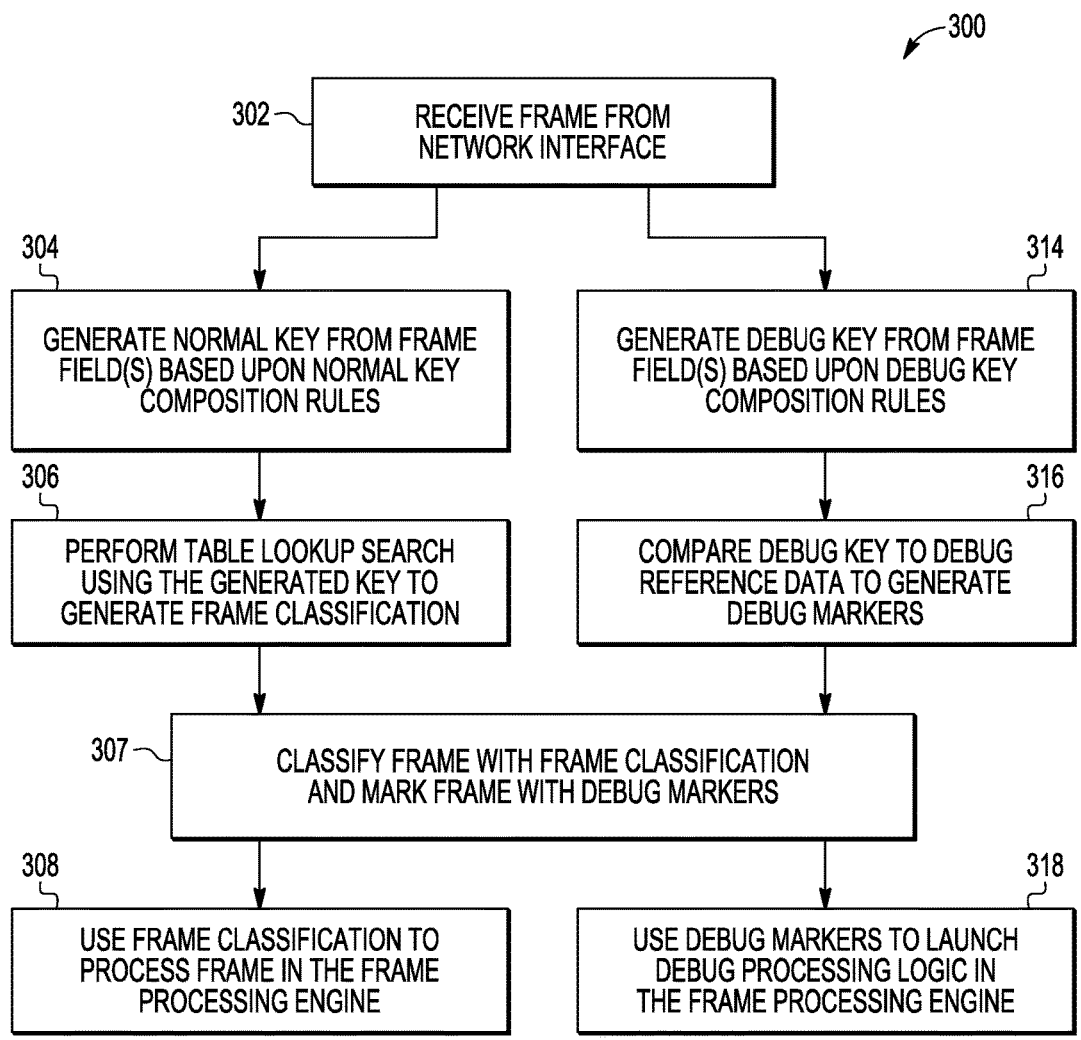
FIG. 3 is a process flow diagram of an example embodiment for non-intrusive generation of debug keys and debug frame markers along with frame classification.

FIG. 3 is a process flow diagram of an example embodiment 300 for debug key generation and debug frame marker generation along with frame classification. In block 302, a frame is received from a network interface and used for a frame classification processing path (including blocks 304/306/307/308) and for debug marker processing path (including blocks 314/316/307/318). Looking first to the frame classification processing path, a normal key is generated in block 304 from a first set of one or more fields within the frame based upon normal key composition rules. In block 306, the normal key is used to perform a table lookup search to generate a frame classification. Looking now to debug marker processing path, a debug key is generated in block 314 from a second set of one or more fields within the frame based upon debug key composition rules. The first and second sets of one or more fields can be the same, if desired, or they can be different. In block 316, the debug key is compared to debug reference data to generate one or more debug markers if matches are found. As described above, if no debug matches are located with respect to the debug key, then no debug markers are generated in block 316. As also described above, data masks can also be applied, if desired.

The frame classification from block 306 and the debug markers from block 316, if any, are passed to block 307. In certain embodiments, the normal key and debug key generation along with the frame classification lookups and debug key comparisons occur concurrently in parallel so that the frame classification from block 306 and the debug markers from block 316, if any, can be passed to block 307 in phase with each other. In block 307, the frame is classified with the frame classification, and the frame is also marked with the debug markers for debug processing. For example, any generated debug markers can be added to the metadata associated with the frame, and the frame classification can be added to the frame or its metadata. In block 308, the frame classification is used to process the frame within the frame processing engine. In block 318, the debug markers are used to trigger debug processing logic within the frame processing engine. It is noted that the frame processing in block 308 and the debug processing in block 318 can also occur in parallel using one or more processing operations working in parallel to process the received frame according to the debug markers and according to the frame classification. It is noted that different and/or additional processing blocks could also be implemented, as desired, while still taking advantage of the debug key and marker generation techniques described herein.

Advantageously, the disclosed embodiments mark network frames for debug processing in real-time without adversely affecting the performance of the frame classification operations and without requiring modification to the frame contents. As such, non-intrusive real-time debug processing is provided by the disclosed embodiments. Further, a wide variety of debug key composition rules can be defined along with a wide variety of data masks and debug reference data so that frames can be processed and marked in a wide variety of ways for debug processing. Other variations can also be implemented while still taking advantage of the debug processing techniques described herein As described herein, a variety of embodiments can be implemented and different features and variations can be implemented, as desired.

For one embodiment, a method for network frame processing is disclosed that includes receiving a frame from a network interface, generating a normal key and a debug key for the received frame with a key generation engine, comparing the normal key to classification reference data to generate a frame classification, comparing the debug key to debug reference data to generate one or more debug markers, and using the frame classification and the one or more debug markers to process the received frame.

In further embodiments, the debug key comparing occurs at least in part concurrently with the normal key comparing. In additional embodiments, the method further includes receiving the frame classification and the one or more debug markers in phase with each other, classifying the received frame with the frame classification, and marking the received frame with the one or more debug markers.

In still further embodiments, the method also includes generating the normal key using data extracted from a first set of one or more fields for the received frame and generating the debug key using data extracted from a second set of one or more fields for the received frame. In additional embodiments, the method further includes selecting the second set of one or more fields based upon one or more debug key composition rules. Still further, the method can also include generating one or more extract commands based upon the one or more debug key composition rules and extracting data from the second set of one or more fields using the one or more extract commands. In other embodiments, the method further includes selecting the first set of one or more fields based upon one or more normal key composition rules. Still further, the method can also include generating one or more extract commands based upon the one or more normal key composition rules and extracting data from the first set of one or more fields using the one or more extract commands.

In additional embodiments, the method also includes marking the received frame using the one or more debug markers and triggering debug processing based upon the one or more debug markers for the received frame. In other embodiments, the method also includes processing the received frame based upon the frame classification.

For another embodiment, a system for network frame processing is disclosed that includes a network interface configured to receive network communications and to output frames associated with the network communications, a key generation engine configured to receive a frame from the network interface and to generate a normal key and a debug key for the received frame, frame classification logic configured to compare the normal key to classification reference data and to generate a frame classification for the received frame, debug comparison logic configured to compare the debug key to debug reference data and to generate one or more debug markers for the received frame, and a frame processing engine configured to use the frame classification and the one or more debug markers to process the received frame.

In further embodiments, the debug comparison logic is configured to operate concurrently with the frame classification logic. In additional embodiments, the system further includes frame marking logic configured to receive the frame classification and the one or more debug markers in phase with each other, to classify the received frame with the frame classification, and to mark the received frame with the one or more debug markers.

In still further embodiments, the normal key is based upon data extracted from a first set of one or more fields for the received frame, and the debug key is based upon data extracted from a second set of one or more fields for the received frame. In additional embodiments, the key generation engine is further configured to select the second set of one or more fields based upon one or more debug key composition rules. Still further, the key generation engine is further configured to generate one or more extract commands based upon the one or more debug key composition rules and to extract data from the second set of one or more fields using the one or more extract commands. In other embodiments, the key generation engine is further configured to select the first set of one or more fields based upon one or more normal key composition rules. Still further, the key generation engine is further configured to generate one or more extract commands based upon the one or more normal key composition rules and to extract data from the first set of one or more fields using the one or more extract commands.

In additional embodiments, the system further includes frame marking logic configured to mark the received frame using the one or more debug markers, and the frame processing engine is further configured to trigger debug processing logic based upon the one or more debug markers. In other embodiments, the frame processing engine is further configured to process the received frame based upon the frame classification.

It is noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer readable mediums (e.g., data storage devices, flash memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for network frame processing, comprising receiving a frame from a network interface;

generating a normal key and a debug key for the received frame with a key generation engine;

comparing the normal key to classification reference data to generate a frame classification;

comparing the debug key to debug reference data to generate one or more debug markers at least in part concurrently with the normal key comparing;

classifying the received frame with the frame classification and marking the received frame with the one or more debug markers; and using the frame classification and the one or more debug markers to process the received frame in parallel according to the frame classification and the one or more debug markers.

2. The method of claim 1, further comprising receiving the frame classification and the one or more debug markers in phase with each other.

3. The method of claim 1, further comprising:

generating the normal key using data extracted from a first set of one or more fields for the received frame; and generating the debug key using data extracted from a second set of one or more fields for the received frame.

4. The method of claim 3, further comprising selecting the second set of one or more fields based upon one or more debug key composition rules.

5. The method of claim 4, further comprising:

generating one or more extract commands based upon the one or more debug key composition rules; and extracting data from the second set of one or more fields using the one or more extract commands.

6. The method of claim 3, further comprising selecting the first set of one or more fields based upon one or more normal key composition rules.

7. The method of claim 6, further comprising:

generating one or more extract commands based upon the one or more normal key composition rules, and extracting data from the first set of one or more fields using the one or more extract commands.

8. The method of claim 1, further comprising triggering debug processing based upon the one or more debug markers for the received frame.

9. A system for network frame processing, comprising a network interface configured to receive network communications and to output frames associated with the network communications;

a key generation engine configured to receive a frame from the network interface and to generate a normal key and a debug key for the received frame;

frame classification logic configured to compare the normal key to classification reference data and to generate a frame classification for the received frame;

debug comparison logic configured to compare the debug key to debug reference data and to generate one or more debug markers for the received frame, the debug comparison logic being configured to operate concurrently with the frame classification logic;

frame marking logic configured to receive the frame classification and the one or more debug markers, to classify the received frame with the frame classification, and to mark the received frame with the one or more debug markers; and a frame processing engine configured to use the frame classification and the one or more debug markers to process the received frame in parallel according to the frame classification and the one or more debug markers.

10. The system of claim 9, wherein the frame marking logic is further configured to receive the frame classification and the one or more debug markers in phase with each other.

11. The system of claim 9, wherein the normal key is based upon data extracted from a first set of one or more fields for the received frame, and the debug key is based upon data extracted from a second set of one or more fields for the received frame.

12. The system of claim 11, wherein the key generation engine is further configured to select the second set of one or more fields based upon one or more debug key composition rules.

13. The system of claim 12, wherein the key generation engine is further configured to generate one or more extract commands based upon the one or more debug key composition rules and to extract data from the second set of one or more fields using the one or more extract commands.

14. The system of claim 11, wherein the key generation engine is further configured to select the first set of one or more fields based upon one or more normal key composition rules.

15. The system of claim 14, wherein the key generation engine is further configured to generate one or more extract commands based upon the one or more normal key composition rules and to extract data from the first set of one or more fields using the one or more extract commands.

16. The system of claim 9, wherein the frame processing engine is further configured to trigger debug processing logic based upon the one or more debug markers.

* * * * *